US012698964B2

(12) United States Patent
Lipunov et al.

(10) Patent No.: US 12,698,964 B2
(45) Date of Patent: Aug. 4, 2026

(54) CALIBRATION MARK APPARATUS

(71) Applicant: RAPSODO PTE. LTD., Singapore (SG)

(72) Inventors: Evgeny Lipunov, Singapore (SG);
Samuel Whitcomb, Singapore (SG);
Janice Hui Lin Tan, Singapore (SG);
Batuhan Okur, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 295 days.

(21) Appl. No.: 18/527,245

(22) Filed: Dec. 2, 2023

(65) Prior Publication Data

US 2025/0180351 A1 Jun. 5, 2025

(51) Int. Cl.
*G01B 21/04* (2006.01)

(52) U.S. Cl.
CPC ................................... *G01B 21/042* (2013.01)

(58) Field of Classification Search
CPC .......... G01B 21/042; F41J 3/0004; F41J 1/00;
F41G 3/12; F41G 3/18; F41G 3/2633
USPC ....... 73/1.79, 1.86, 1.89, 105; 348/135, 136,
348/137, 140; 89/200–206; 33/14–16,
33/280, 406, 415
See application file for complete search history.

(56) References Cited

U.S. PATENT DOCUMENTS

| | | | |
|---|---|---|---|
| 9,965,870 | B2 | 5/2018 | Claveau et al. |
| 10,269,141 | B1 | 4/2019 | Shotan |
| 2004/0170315 | A1 | 9/2004 | Kosaka et al. |
| 2017/0032526 | A1 | 2/2017 | Gao et al. |
| 2020/0191927 | A1 | 6/2020 | Lin |
| 2020/0252604 | A1 | 8/2020 | Schneider et al. |

FOREIGN PATENT DOCUMENTS

| | | | | | |
|---|---|---|---|---|---|
| CA | 2961921 | A1 | * | 9/2017 | |
| CN | 109844452 | A | * | 6/2019 | .............. G06T 7/80 |
| CN | 110230979 | A | * | 9/2019 | .......... G01B 21/042 |
| CN | 118628579 | A | * | 9/2024 | .............. G06T 7/80 |
| DE | 102016008689 | A1 | * | 2/2017 | ............. G01B 11/00 |

\* cited by examiner

*Primary Examiner* — Robert R Raevis
(74) *Attorney, Agent, or Firm* — Scully, Scott, Murphy & Presser, P.C.

(57) ABSTRACT

A calibration mark apparatus includes a support having at least one wall with at least one calibration pattern on the least one wall and at least one attachment portion extending from the least one wall. The attachment portion may be a flap extending from at least one wall for attaching the support to a surface or a net. The support may be a three-dimensional (3D) structure. The calibration mark apparatus may have walls that are foldable along a common edge into a single plane. The calibration mark apparatus may have a base connecting the walls including raised tab portions arranged to fit into slots in the flap. The flap may include openings for attaching multiple supports together by a rope that is arranged to feed through the openings. The calibration mark apparatus may include a bracket to mount the support to a surface or a net by clips.

11 Claims, 7 Drawing Sheets

<u>70</u>

100

92

98

104

100

92

72

98

CALIBRATION MARK APPARATUS

BACKGROUND

The present disclosure relates to calibration marks for calibrating cameras and more particularly, to an apparatus for securely placing or mounting calibration marks on an athletic field or in a practice area for calibrating cameras for tracking a moving object.

Systems for analyzing various characteristics of a moving object are known. In one example, analyzing the movement of an object may be related to participating in a sport where the moving object may be part of the sport itself, such as a baseball, golf ball, tennis ball, hockey puck, cricket ball, ammunition for skeet or target shooting, and the like.

Systems for tracking a moving object use three-dimensional (3D) metric information to be extracted from two-dimensional (2D) images taken by one or more cameras. The cameras must be first calibrated for optical and geometric characteristics. Camera calibration is a process of estimating the intrinsic and extrinsic camera parameters based on observations of a known physical target. The intrinsic parameters of a camera relate to the internal geometry and optical characteristics of the camera itself, while the extrinsic parameters measure the location and orientation of the camera with respect to a world coordinate system in 3D space.

Conventional camera calibration techniques use one or more images of a specifically designed calibration target or mark. The calibration target includes several readily detectable fiducial markers or features with known relative 3D positions. By fixing the world coordinate system in the calibration object, point correspondences between 3D world points and 2D image points can be established. The intrinsic and extrinsic camera parameters can be computed by solving the system of equations resulting from these point correspondences.

The most commonly used calibration marks available are typically quite big and bulky and thus are suitable for room size installations for so called "factory calibration".

In an athletic field, however, the known calibration marks may be used but with limitations primarily due to their bulky size. The currently available calibration marks cannot sustain being hit by a ball hit and are prone to being accidentally misplaced or misaligned.

SUMMARY

In one embodiment, a calibration mark apparatus includes a support having at least one wall with at least one calibration pattern on the least one wall and at least one attachment portion extending from the least one wall. In one embodiment of the calibration mark apparatus, the least one attachment portion comprises a flap extending from the least one wall that is configured for attaching the support to a surface or a net. In one embodiment of the calibration mark apparatus, the support is a three-dimensional structure, which in one example, can be a prism shape. In one embodiment of the calibration mark apparatus, the three-dimensional structure has a triangular prism shape of a pair of walls extending from a common edge to a pair of spaced apart edges opposite to the common edge, in which the pair of walls each have an inner surface facing each other and an outer surface facing away from each other, with the at least one calibration pattern being on at least one of the outer surfaces. In one embodiment of the calibration mark apparatus, the pair of walls are foldable along the common edge into a single plane.

In one embodiment of the calibration mark apparatus, a base connects to each of the opposite edges of the pair of walls. In one embodiment of the calibration mark apparatus, the flap includes one or more slots, and the base includes one or more raised tab portions, wherein at least one raised tab portion is arranged to fit into the one or more slots of the flap. In one embodiment of the calibration mark apparatus, the flap includes openings configured for attaching multiple supports together such that the multiple supports are spaced from each other. In one embodiment of the calibration mark apparatus, a rope is arranged to feed through the openings to attach multiple supports together.

In one embodiment of the calibration mark apparatus, the least one attachment portion includes a bracket configured to mount the support to a surface or a net. In one embodiment of the calibration mark apparatus, at least one clip is included for attaching the bracket to the support. In one embodiment of the calibration mark apparatus, the support includes a corresponding slot for receiving each of the at least one clip. In one embodiment of the calibration mark apparatus, the bracket includes a corresponding slot for receiving each of the at least one clip. In one embodiment of the calibration mark apparatus, the at least one clip is configured to attach a rope to the support. In one embodiment of the calibration mark apparatus, the at least one clip includes a body portion, a first extension portion extending from an edge of the body portion and a second extension portion extending from an opposing edge of the body portion. In one embodiment of the calibration mark apparatus, the at least one clip further includes a resistance means configured to adjust the resistance of the clip. In one embodiment of the calibration mark apparatus, the body portion is configured to press the rope against the one surface of the support, and the first and second extensions are foldable relative to the body portion to fit into the corresponding slots in the support and the bracket. In one embodiment of the calibration mark apparatus, the body portion includes two walls that hold the rope therebetween, and the first and second extensions are foldable relative to the body portion to fit into the corresponding slots in the support and the bracket.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

Further features as well as the structure and operation of various embodiments are described in detail below with reference to the accompanying drawings. In the drawings, like reference numbers indicate identical or functionally similar elements.

DETAILED DESCRIPTION

Figure 1:
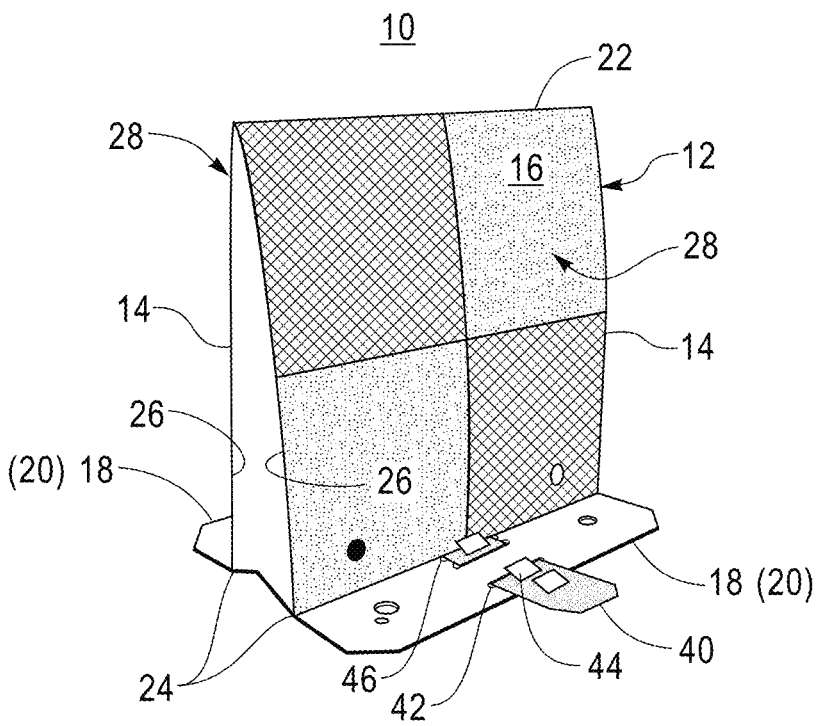
FIG. 1 is an isometric diagram of one embodiment of the calibration mark apparatus disclosed in this specification.
Figure 2:
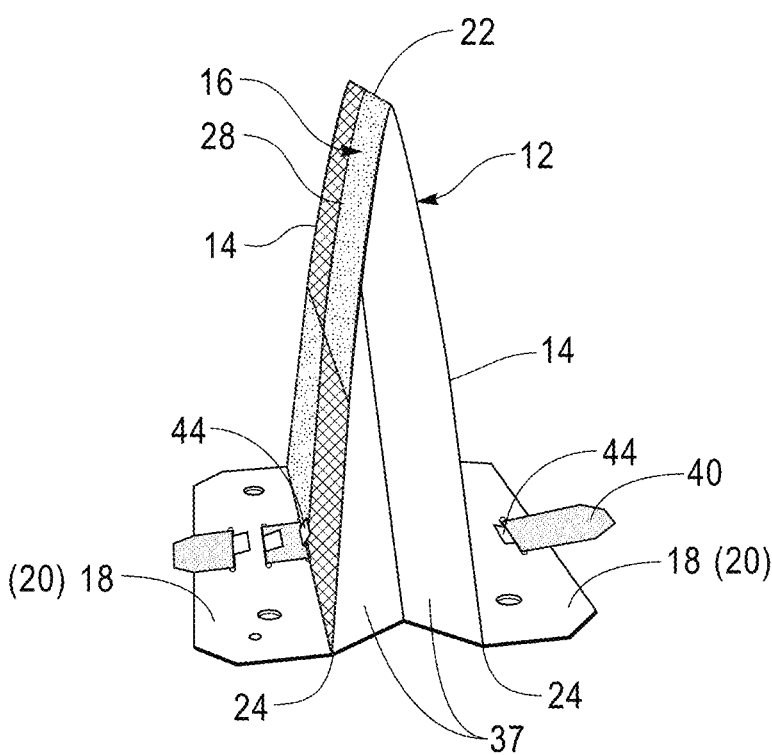
FIG. 2 is an isometric diagram of one embodiment of the calibration mark apparatus disclosed in this specification.

As shown in FIG. 1, in one embodiment, the calibration mark apparatus 10 includes a support 12 having two walls 14. However, other configurations are contemplated, including a single wall support or supports of three or more walls. As shown in FIGS. 1 and 2, in one embodiment, a calibration pattern 16 is provided on each wall 14. However, other configurations are contemplated, including where the calibration pattern 16 is provided on less than all the walls forming the support 12. In some embodiments, calibration mark apparatus 10 includes a support 12 having two walls 14 where a calibration pattern 16 is provided on one of the two walls 14.

In the embodiment of FIG. 1, the calibration pattern 16 is a checkerboard pattern. However, any other suitable calibration patterns may be employed. The wall 14 containing the calibration pattern 16 may be made of any material sufficient to support the calibration pattern 16. For example, suitable materials for the support wall 14 include plastics, hard or soft polymers, metal and various composite materials. Polymers may include polycarbonate, acrylonitrile, butadiene, styrene (ABS), bakelite, polyethylene, polypropylene and mixtures thereof.

As shown in FIGS. 1 and 2, in one embodiment, the calibration mark apparatus 10 further includes an attachment portion 18 extending from each wall 14. However, other configurations are contemplated, including where the attachment portion 18 extends from less than all the walls 14 of the support 12. In one embodiment, the attachment portion 18 is a flap 20 extending from the wall 14. The flap 20 may extend from one wall 14 or both walls 14. In some embodiments, the attachment portion 18 is integrated with the material forming the walls 14. In some embodiments, the attachment portion 18 is a separate piece of material connected to the walls 14. In some embodiments, the attachment portion 18 is detachable from the walls 14. In some embodiments, the flap 20 is configured for attaching the support 12 to a surface or a net as described below.

In one embodiment, as shown in FIGS. 1 and 2, the support 12 is a three-dimensional (3D) structure having a prism shape. However, other three-dimensional (3D) shapes are contemplated. The three-dimensional structure as shown in FIGS. 1 and 2, has a triangular prism shape formed by the pair of walls 14 extending from a common edge 22 to a pair of spaced apart edges 24 opposite to the common edge 22. As shown in FIG. 1, the pair of walls 14 each have an inner surface 26 facing each other and an outer surface 28 facing away from each other. The calibration pattern 16 is on the outer surface 28.

Figure 3:
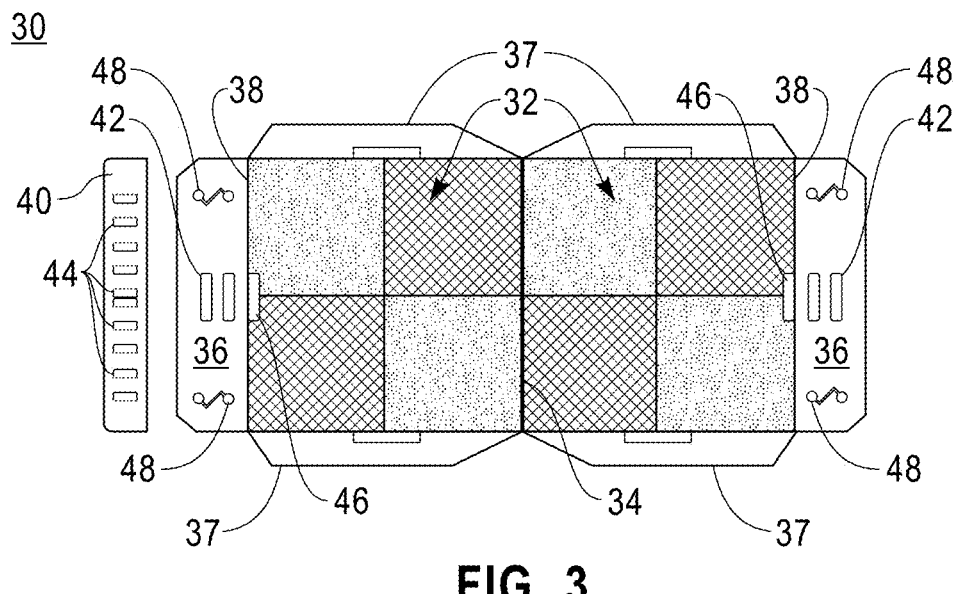
FIG. 3 is diagram showing one embodiment of a pre-folded single piece material for forming calibration mark apparatus disclosed in this specification.

In some embodiments, the walls of the calibration mark apparatus may be foldable from a structure in a single plane into a three-dimensional (3D) structure and then refoldable into the single plane. In one embodiment, as shown in FIG. 3, the calibration mark apparatus 30 includes a pair of wall portions 32. The wall portions 32 are foldable at a center line 34 from a single plane to form a three-dimensional (3D) support structure, such as the support 12 shown in FIG. 1. In some embodiments, the calibration mark apparatus may be manufactured from a single piece of material in which the center line 34 is formed of a living hinge. In some embodiments, the walls 32 are separate pieces of material that are connected by a hinge, such as a pin hinge. The calibration mark apparatus 30 having the foldable walls 32 is thereby conveniently portable for easy transport for use at different locations, such an athletic field or a training center. In some embodiments, for easy transport and keeping it compact, the calibration mark apparatus 30 may be stored in the single plane structure such as shown in FIG. 3.

In some embodiments, the calibration mark apparatus may be manufactured via die cut followed by a folding step. In some embodiments, the calibration mark apparatus may be manufactured via injection molding. In some embodiments, the calibration mark apparatus manufactured via injection molding may include living hinges. In some embodiments, the calibration pattern may be printed via ultraviolet (UV) printing or silkscreen (or screen printing). In some embodiments, for outdoor use over long periods, laser etching method may be employed to avoid the fading of inks and dyes. In some embodiments, infrared (IR) reflective markings may be used in the case of low light calibration where IR light source is used for illumination.

As shown in FIG. 3, the calibration mark apparatus 30 includes flap portions 36 that extend from the sides of the wall portions 32 opposite to the center line 34. In some embodiments, the flap portions 36 may be manufactured from the same single piece of material as the wall portions 32. In some embodiments, the flap portions 36 are foldable along lines 38. In some embodiments, the lines 38 are formed of a living hinge. In some embodiments, the flap portions 36 are separate pieces of material that are connected by a hinge, such as a pin hinge to the walls 32. In some embodiments, as shown in FIG. 3, the single piece of material from which the calibration mark apparatus is formed, includes side flaps 37. The side flaps 37 are folded to be within the interior space between the walls 32 when forming the calibration mark apparatus 30 into a three-dimensional (3D) structure. As shown in FIG. 2, side flaps 37 provide additional stability to maintain the calibration mark apparatus 10 in the three-dimensional shape and to aid in withstanding a ball hit during use.

The calibration mark apparatus of the present disclosure has form factor that permits the apparatus to be easily to carried and installed. In addition, the calibration mark apparatus of the present disclosure can be used in various environments including on the athletic field or in a cage during a training session. The portability of the calibration mark apparatus of the present disclosure allows the calibration marks to be easily positioned so as not to obstruct the trajectory of the ball during play or during training. Advantageously, the calibration mark apparatus of the present disclosure can in most cases sustain a ball hit during use.

In some embodiments, the calibration mark apparatus may include a base connected to the support. In one embodiment, as shown in FIGS. 1 and 2, a base 40 is connected to the pair of spaced apart edges 24 of the walls 14. In some embodiments, the base 40 may be connected to the attachment portion 18. The base 40 provides added stability when the calibration mark apparatus 10 is placed on the ground or attached to a side of a practice net or cage.

In one embodiment, as shown in FIG. 3, the flaps 36 includes one or more slots 42, and the base 40 includes one or more raised tab portions 44. The one or more raised tab portions 44 are arranged on the base 40 to fit into the slots 42 of the flaps 36. As shown in FIGS. 1 and 2, the tab portions 44 extend through slots 42 in both flaps 20 to maintain the three-dimensional (3D) shape of the calibration mark apparatus 10. In some embodiments, as shown in FIG. 3, the walls 32 of the calibration mark apparatus 30 include a slot 46 at the line 38. It is to be understood that slot 46 may be located elsewhere for example at the proximity of line 38. As shown in the embodiment of FIG. 1, the base 40 fits into the slot 46 in the wall 14 and a raised tab portion 44 presses against the wall 14 for added stability.

Figure 4:
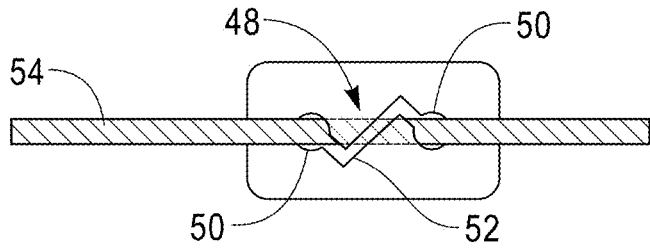
FIG. 4 is close up view of one embodiment openings for securing a rope or cable to the calibration mark apparatus disclosed in this specification.
Figure 5:
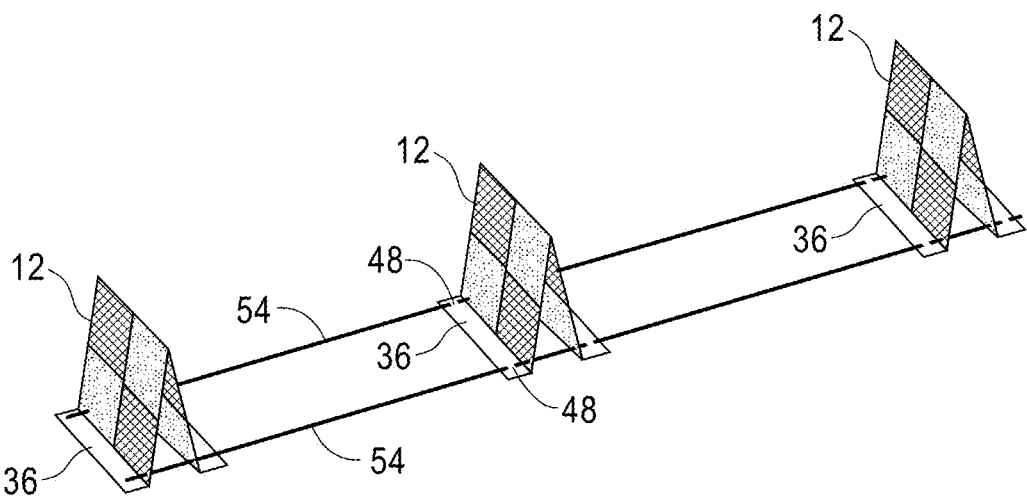
FIG. 5 is diagram of one embodiment of the calibration mark apparatus disclosed in this specification in which multiple marks are connected by a rope or cable.

In some embodiments, the calibration mark apparatus may be configured to attach multiple support structures together such that the multiple supports are spaced from each other in a line. In one embodiment, as shown in FIG. 3, the flaps 36 include openings 48 configured for receiving a rope, a cable or other similar structure for attaching multiple supports together. In some embodiments, as shown in FIG. 3, a pair of openings 48 are provided on the flaps 36 at spaced locations. It is to be understood that other configurations of opening, for example single opening or multiple opening may also be used. In one embodiment, as shown in the close-up view of the openings 48 in FIG. 4, the openings 48 have two circular portions 50 and a central tooth shaped portion 52. A rope or cable 54 is fed through the two circular portions 50 and interleaved through the teeth of the tooth shaped portion 52. In one embodiment, as shown in FIG. 5, multiple supports 12 are attached together using two ropes or cables 54 fed through the openings 48 on the flaps 36. In some embodiments, the rope, the cable or other similar structure for attaching multiple supports together may be colored or marked like a ruler such that adjusting the spacing between the supports is easy and the distances are immediately understood. In one embodiment, as an alternative to the openings 48, a tooth shaped cut portion is provided in the flaps 36 such that when no force is applied to the tooth shaped cut portion, the rope or cable 54 cannot be fed through. However, other shapes are contemplated, including straight line shaped or wave line shaped. Only when one of the opposing sides of the tooth shaped cut portion is pressed, an opening is formed therein and the rope or cable can then be fed through the opening. The tooth shaped cut portion can thus be opened when force is applied and closed when no force is applied. In some embodiments, the "close" and "open" configuration of the cut portion may be associated with the flexibility of the materials used for forming the flaps.

By connecting multiple calibration mark support structures 12 together as shown in FIG. 5, the calibration marks can be easily placed on the ground of an athletic field. The rope or cable 54 may be secured to the ground using any suitable means such as by a tent peg, a nail or a clamp. In some embodiments, for use in low light conditions, the calibration mark apparatus may further comprise one or more lights, for example in the centers of the calibration mark apparatus. In addition, because the position of each of the support structures 12 is adjustable on the rope or cable 54, the calibration mark may be used for calibrating the camera of a sports object tracking device or launch monitor that is placed close to ground level, where round lines, field bounds, home plate, etc., are not visible. In some embodiments, additional rope, cable or other similar structure may be added at a specific location of the calibration mark apparatus such that the calibration mark apparatus can be raised, lowered or stowed away. In some embodiments, the specific location may be along the top part of the calibration mark apparatus.

Figure 6:
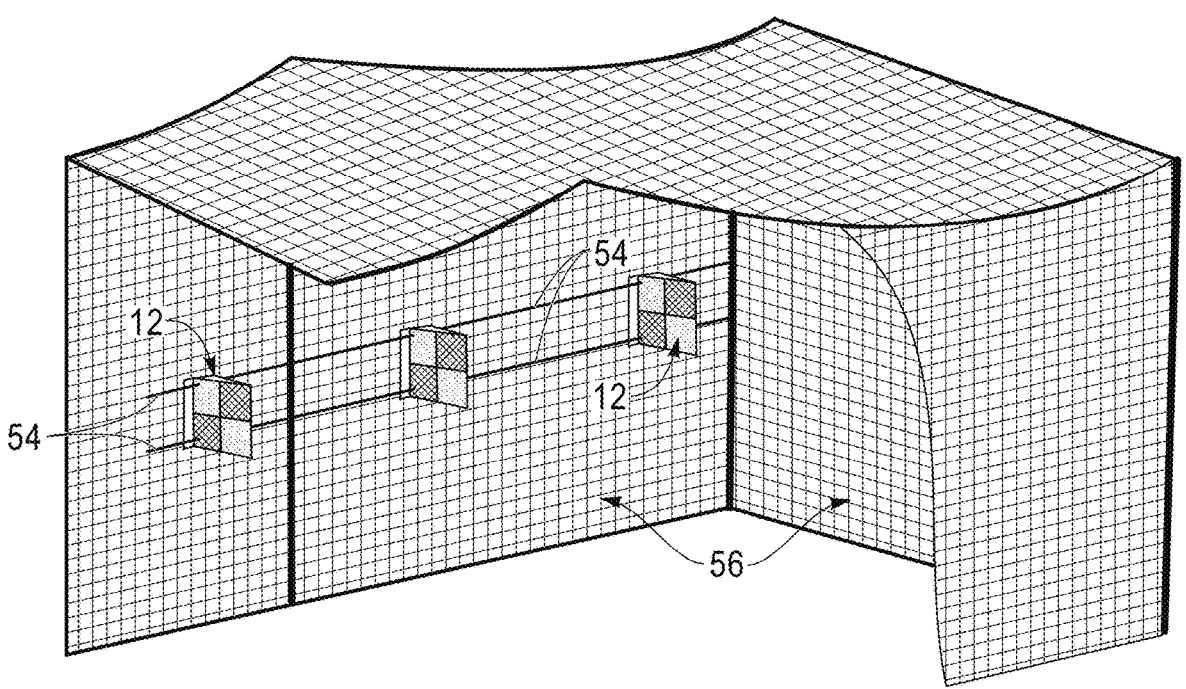
FIG. 6 is diagram of one embodiment of the calibration mark apparatus disclosed in this specification in which multiple marks are connected to the side of a net.
Figure 7:
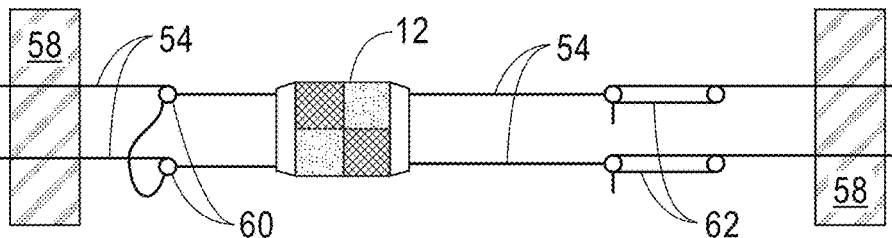
FIG. 7 is diagram of one embodiment of the calibration mark apparatus disclosed in this specification in which multiple marks are connected to a pair of poles.

In addition, by feeding a rope or cable 54 through openings 48 of the flaps 36, the calibration mark support structure 12 as shown in FIG. 5, one or more of the calibration marks can be easily attached to the side wall of a practice cage 56 as shown in FIG. 6. Any suitable means can be used to attach the rope or cable 54 to the cage 56 such a clip or clamp. Alternatively, calibration mark support structures 12 may be individually directly attached to the netting by fitting the netting into the openings 48 similar to how the rope 54 is attached as shown in FIG. 4. In some embodiments, the rope or cable 54 connecting one or more calibration mark support structures 12 can also be attached to a pair of poles 58 as shown in FIG. 7. A bowline knot 60 or a hammock knot 62 may be used to provide tension to the rope 54 between the poles 58. By attaching the one or more calibration mark support structures 12 attached to a rope or cable 54 to a pair of poles 58 as shown in FIG. 7 provides a structure that can be positioned for calibrating a camera when using a small practice net instead of a cage. In some embodiments, the rope or cable 54 may be colored or marked like a ruler such that adjusting the spacing between the supports is easy and the distances are immediately understood.

Figure 8:
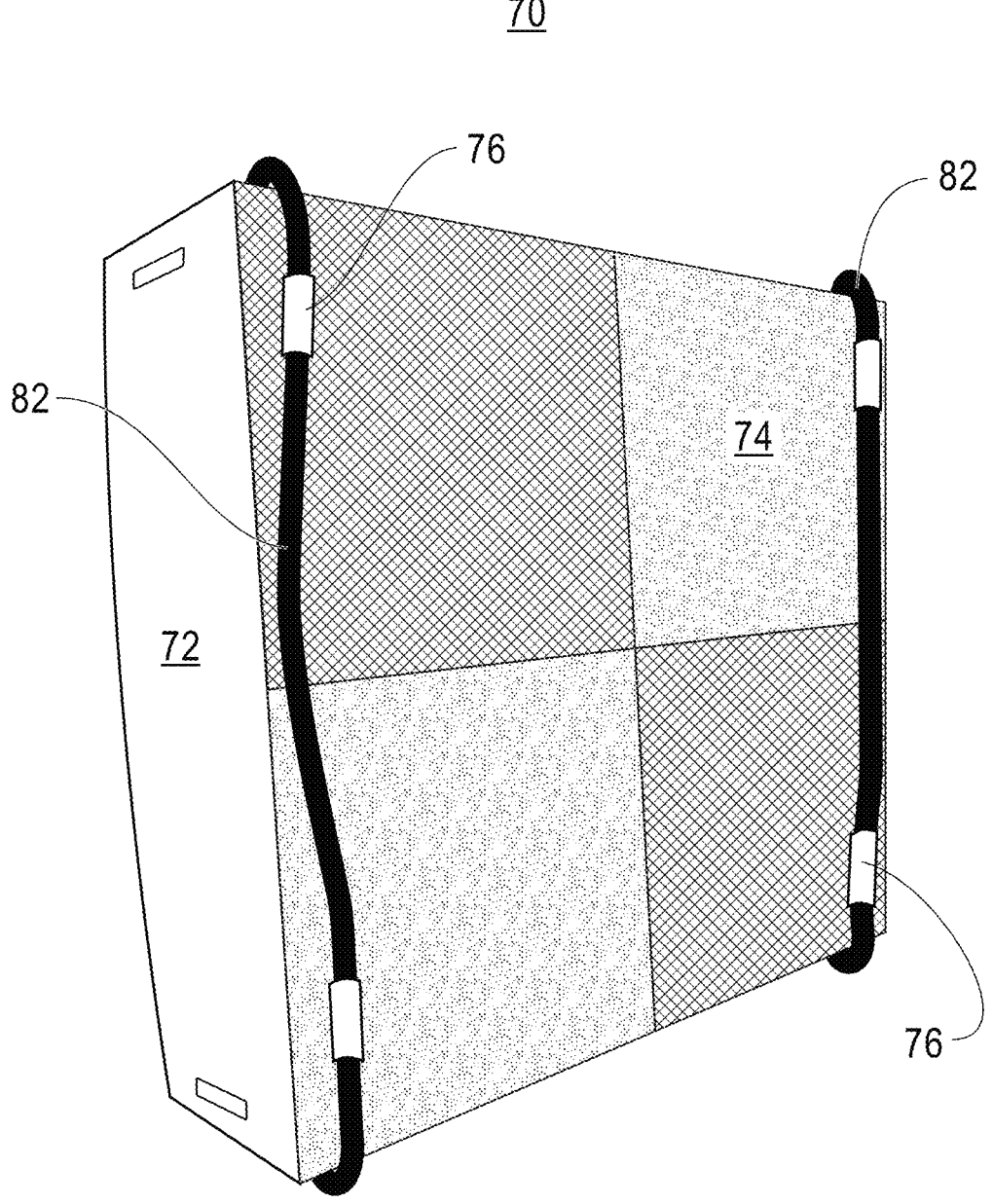
FIG. 8 is an isometric view of one embodiment of the calibration mark apparatus disclosed in this specification in which the mark is attached to a bracket.
Figure 9:
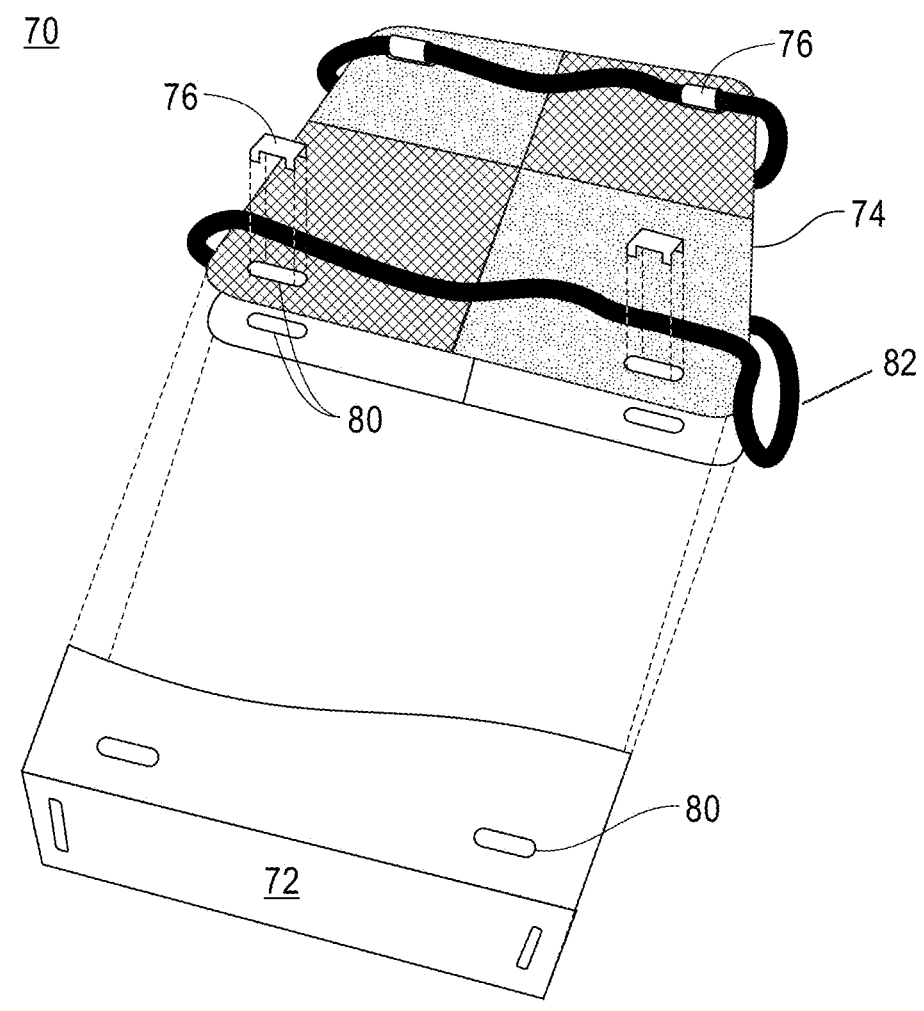
FIG. 9 is an exploded view of one embodiment of the calibration mark apparatus disclosed in this specification of the mark for attachment to a bracket.

In some embodiments, the attachment portion of the calibration mark apparatus is a bracket. As shown in FIG. 8, the calibration mark apparatus 70 includes a bracket 72 configured to mount the support 74 to a surface or a net. In some embodiments, the calibration mark apparatus 70 is a two-dimensional (2D) structure. In some embodiments, the calibration mark apparatus 70 includes one or more clips 76 or other suitable device for attaching the bracket 72 to the support 74. In some embodiments, as shown in FIG. 8, clip 76 is configured to attach a rope 82 to the outer side of the support 74. FIG. 9 is an exploded view of one embodiment of the bracket 72, support 74, rope 82 and clips 76. In some embodiments, as shown in FIG. 9, the support 74 includes corresponding slots 80 for receiving the clips 76. The bracket 72 includes a corresponding slot 80 for receiving each of the clips 76. In some embodiments, slot 80 is configured to receive clip 76 in folded configuration.

Figure 10:
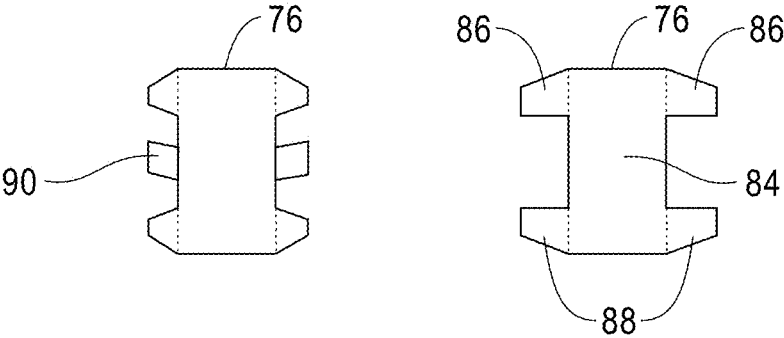
FIG. 10 is diagram of embodiments of a clip of the mark for attaching a bracket of the calibration mark apparatus disclosed in this specification.

In some embodiments, as shown in FIG. 10, the clip 76 comprises a body portion 84, a pair of extension portion 86 extending from one edge of the body portion 84 and a pair of extension portions 88 extending from an opposing edge of the body portion 84. The body portion 84 presses the rope 82 against the support 74 and the extension portions 86 and 88 fit through the slots 80 and are folded apart on the underside of the support 74 to clamp the rope 82 against the support 74. In some embodiments, the clip 76 may include a resistance means for adjusting the resistance of the rope 82 against the support 74. FIG. 10 shows one embodiment of a resistance means in which the clip 76 includes a pair of middle extension portions 90. The middle extension portions 90 when folded towards the inner side of the body portion 84 such that the middle extension portions 90 press against the rope 82 to adjust the resistance of the clip 76. Other forms of a means for adjusting the resistance of the clip 76 against the support 74 are contemplated by this disclosure.

Figure 11A:
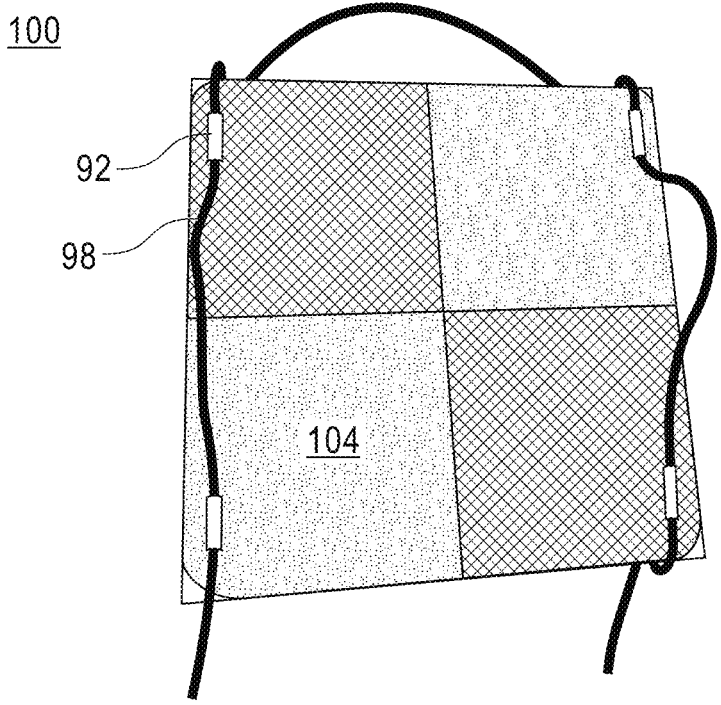
FIGS. 11A to 11C are isometric diagrams of one embodiment of the calibration mark apparatus disclosed in this specification showing a clip attaching a rope to a calibration mark.
Figure 11B:
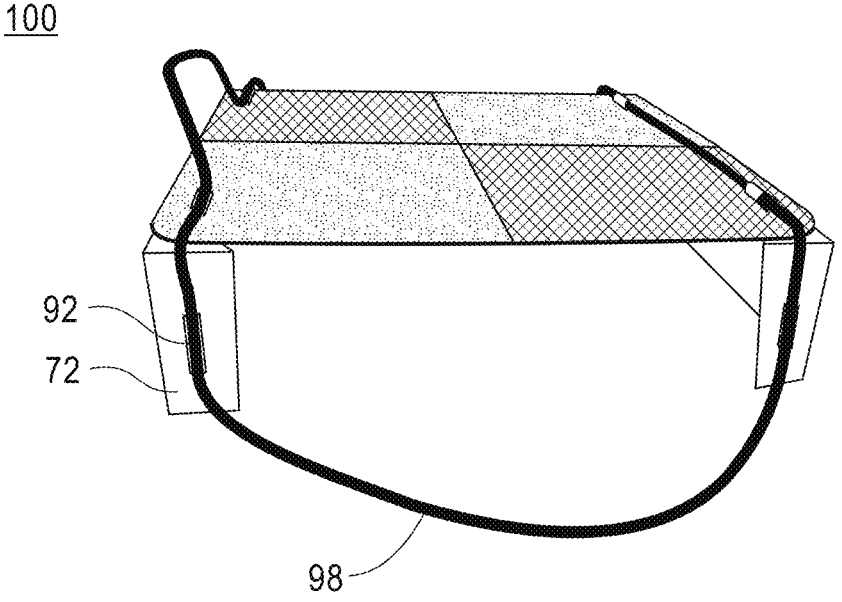
Figure 11C:
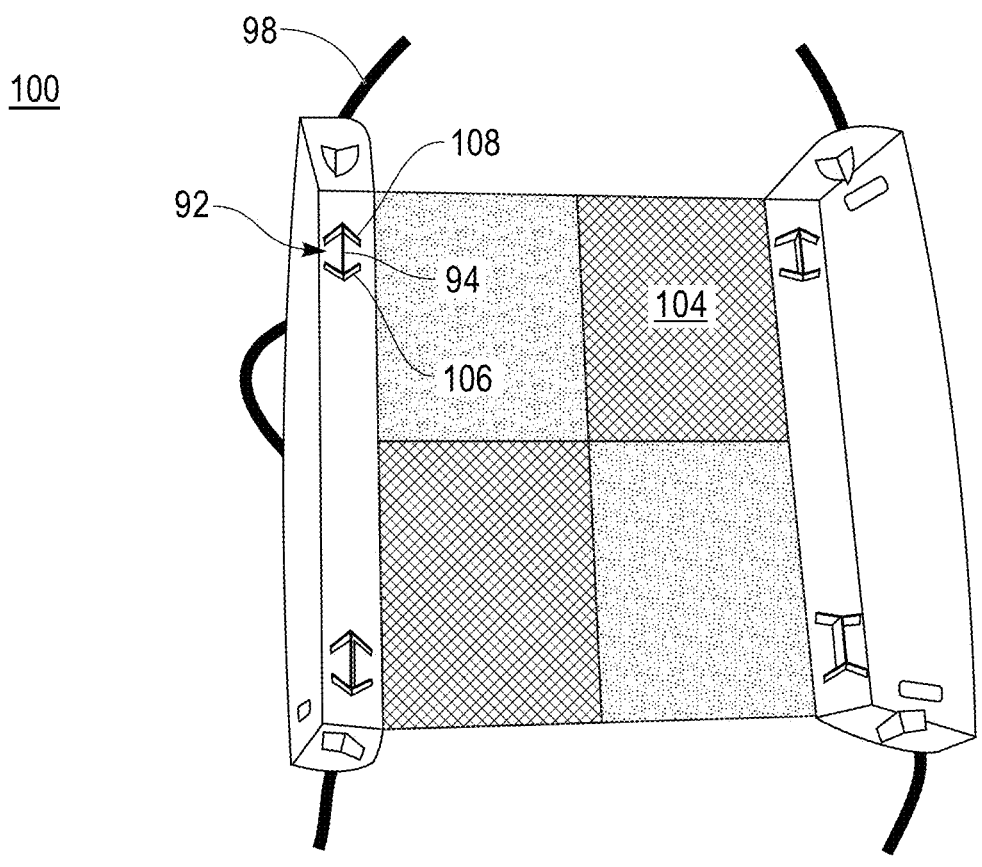
Figure 12:
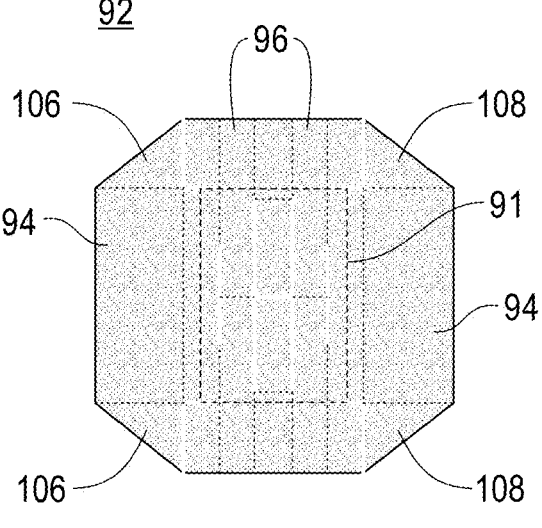
FIG. 12 is diagram showing one embodiment of a pre-folded single piece material for forming a clip for the calibration mark apparatus disclosed in this specification.
Figure 13:
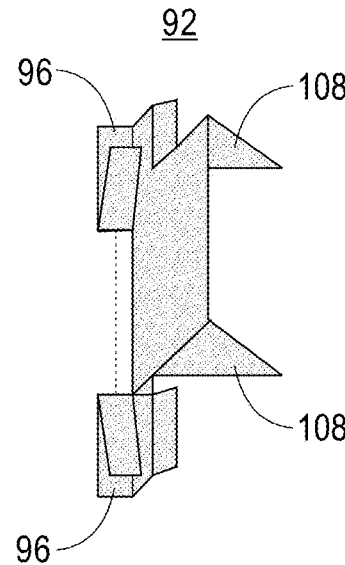
FIG. 13 is an isometric partial view of the clip of FIG. 12 for the calibration mark apparatus disclosed in this specification.

FIGS. 11A-11C show an alternative embodiment of a clip 92. In this example, FIG. 11A shows a top view of a calibration mark apparatus 100, where clip 92 is attached to the support 104, a channel is formed by clip 92 when folded. In some embodiments, the formed channel allows a rope 98 to pass through. FIG. 11B shows a side view of the calibration mark apparatus 100, where clip 92 is also attached to bracket 72. In some embodiments, a rope 98 passes through a channel formed by folded clip 92. FIG. 11C shows a bottom view of calibration mark apparatus 100, where clip 92 is attached to bracket 72 and support 104, pairs of extension section 106, 108 rest on the bracket 72 and provides resistance thereby preventing the clip 92 from detaching from the bracket 72 and support 104 and thus securing the rope. The body portion 94 comes together hiding the rope 98 from view. FIG. 12 shows clip 92 as manufactured in a substantially flat form in unfolded configuration. FIG. 13 shows a partial view of the clip 92 with the various portions folded for use. The middle portion 91 of clip 92 includes a channel for holding the rope therebetween, the channel is formed by the body portions 94 folding about a line between the middle portion 91 and extension sections 106 and 108. The clip 92 includes a first pair of extension sections 106 and a second pair of extension sections 108. The extension sections 106 and 108 are foldable relative to the body portion 94 to fit into corresponding slots (not shown) in the support 104 and bracket 72. The wall sections 96 are foldable to hold the rope 98. In some embodiments, the body portion 94 is dimensioned to be about the length of an opening, such that in a folded configuration (not shown), the clip 92 fits into the opening. Extension sections 106 and 108 prevent the clip from escaping through the opening, as extensions sections 106 and 108 are in a different plane from the opening. Further, wall sections 96 when folded into the middle portion 91 provides additional resistance to the rope as the free space in the channel is reduced.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A calibration mark apparatus comprising:
   a support having at least one wall and at least one calibration pattern on the least one wall; and
   at least one attachment portion extending from at least one of the at least one wall, the at least one attachment portion comprising a flap extending from at least one of the at least one wall, the flap being configured for attaching the support to a surface or a net.

2. The calibration mark apparatus according to claim 1, wherein the support is a three-dimensional structure.

3. The calibration mark apparatus according to claim 2, wherein the three-dimensional structure has a prism shape.

4. The calibration mark apparatus according to claim 2, wherein the three-dimensional structure has a triangular prism shape comprising a pair of walls extending from a common edge to a pair of spaced apart edges opposite to the common edge, the pair of walls each having an inner surface facing each other and an outer surface facing away from each other, the at least one calibration pattern being on at least one of the outer surfaces.

5. The calibration mark apparatus according to claim 4, wherein the pair of walls are foldable along the common edge into a single plane.

6. The calibration mark apparatus according to claim 4, further including a base connected to the pair of the spaced apart edges opposite to the common edge.

7. The calibration mark apparatus according to claim 6, wherein the base is further connected to the flap of the at least one attachment portion.

8. The calibration mark apparatus according to claim 7, wherein the flap includes one or more slots, and the base includes one or more raised tab portions, wherein at least one raised tab portion is arranged to fit into the one or more slots of the flap.

9. The calibration mark apparatus according to claim 7, wherein the flap includes openings configured for attaching multiple supports together such that the multiple supports are spaced from each other.

10. The calibration mark apparatus according to claim 9, further including a rope arranged to feed through the openings to attach the multiple supports together.

11. The calibration mark apparatus according to claim 1, further including a base connected to the support.

* * * * *